Feb. 10, 1953  L. D. BAKKE  2,627,940
INTERNAL-COMBUSTION ENGINE LUBRICATION
Filed Oct. 4, 1950  2 SHEETS—SHEET 1
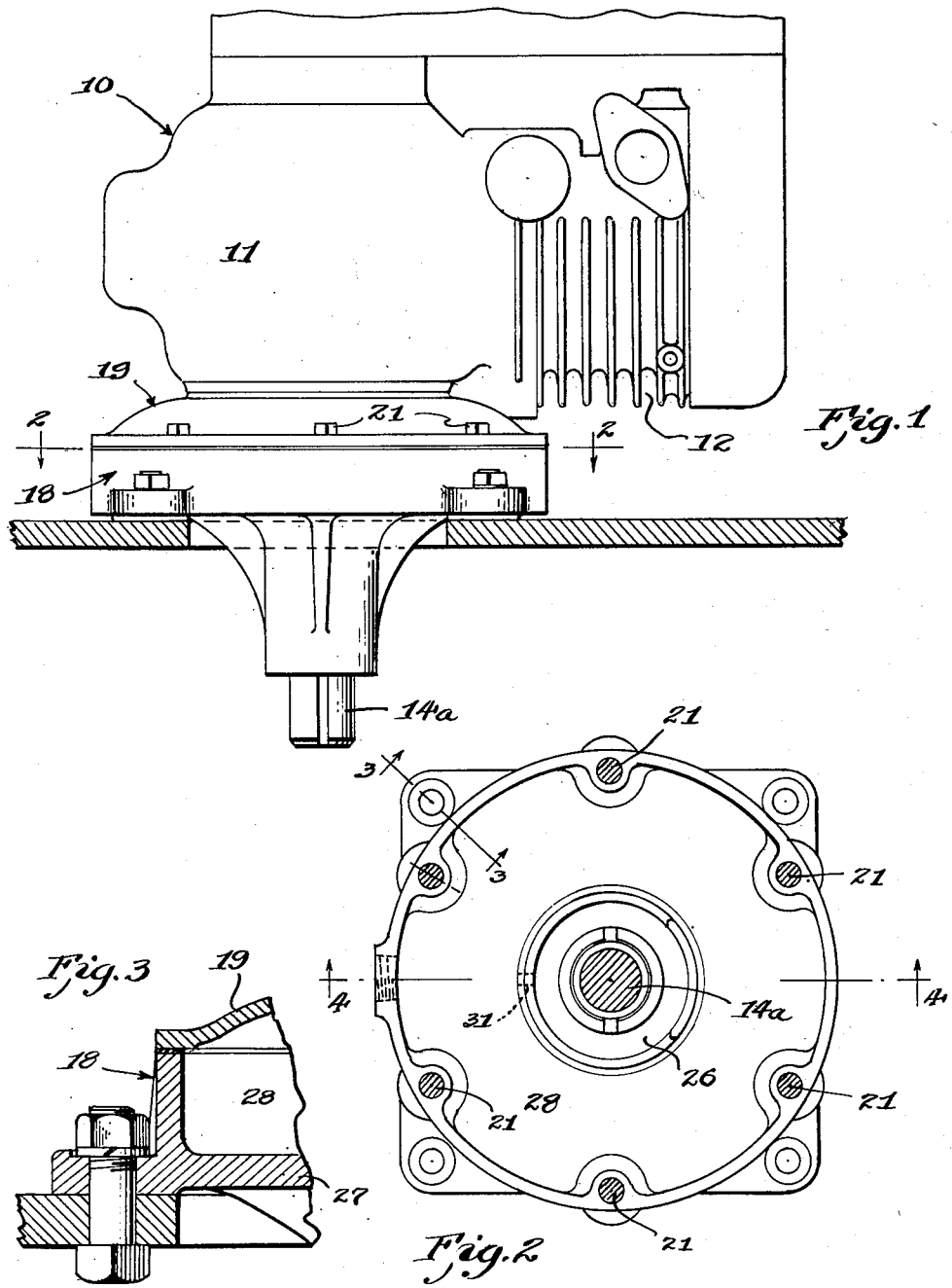
INVENTOR.
Laurence D. Bakke
BY
Hauke & Hardesty
Attorneys.

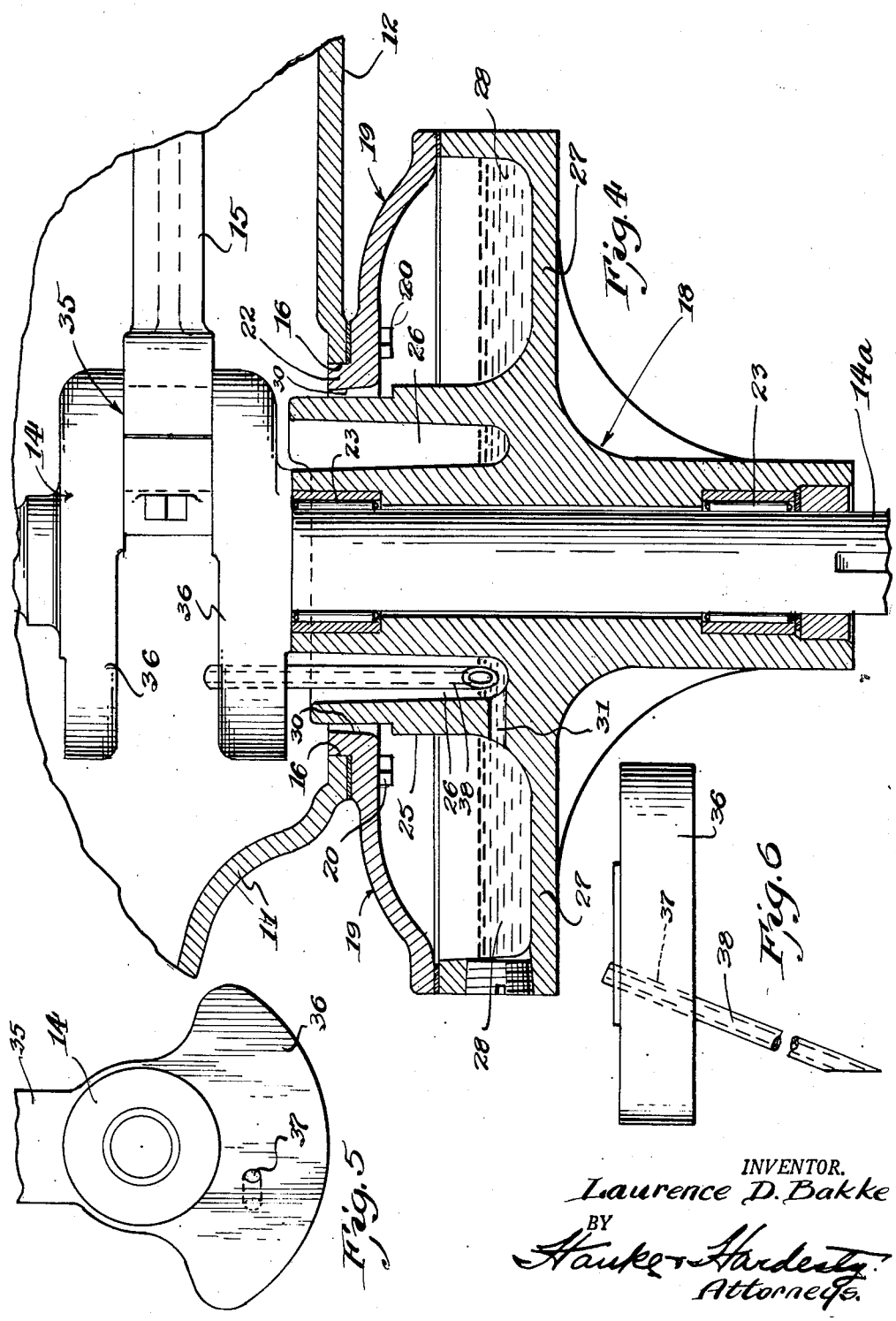

Patented Feb. 10, 1953

2,627,940

UNITED STATES PATENT OFFICE 2,627,940

INTERNAL-COMBUSTION ENGINE LUBRICATION

Laurence D. Bakke, Plymouth, Mich., assignor to Continental Motors Corporation, Detroit, Mich., a corporation of Virginia Application October 4, 1950, Serial No. 188,460

7 Claims. (Cl. 184—13)

My invention relates to internal combustion engines and more particularly to the lubricating system for engines of relatively small horsepower and size, and which comprises a vertically extending crankshaft.

The conventional crankcase oil sump is not applicable to engines of this type and usually some means for force feeding lubricating oil to the moving engine parts to be lubricated is embodied in such engines. The expense of a force feed lubrication system is a problem in connection with the manufacture and sale of such engines, because of the highly competitive nature of this type of engine. Most of this type of power plant embody only a single engine cylinder, and a splash lubrication system is quite adequate in lubricating such moving engine parts that require lubrication.

The present invention is aimed to overcome the lubrication difficulties present in this type of small engine, by providing a splash system applicable to engines having a vertically extending crankshaft.

Engines of this type have of late been quite widely used in powering rotary type power mowers, and the main object of the present invention is to overcome the lubrication problems by providing a simple and compact splash lubrication system which can be embodied in such engines with a minimum of labor and expense, and which requires a minimum of servicing.

For a more detailed understanding of my invention, reference may be had to the accompanying drawings illustrating a preferred embodiment of the invention in which like parts throughout the several views are identified by like reference characters, and in which Fig. 1 is an elevational view of an engine incorporating the principles of my invention.

Fig. 2 is a plan detail view of the crankcase closure element which carries the crankshaft bearings with the adapter removed.

Fig. 3 is a detail sectional view taken on the line 3—3 of Fig. 2, but showing the means for securing the engine to its support and the relation of the adapter to said closure element.

Fig. 4 is a fragmentary vertical sectional view through the engine crankcase and closure assembly and taken generally in the plane indicated by section 4—4 of Fig. 2.

Fig. 5 is a fragmentary detail of the crankshaft showing the counterweight and the relation thereto of the dipper tube, and Fig. 6 is an edge elevation thereof showing the dipper tube and taken substantially normal to the showing thereof in Fig. 4.

The engine herein illustrated comprises a crankcase and cylinder casting 10, preferably consisting of a crankcase portion 11 and a finned engine cylinder 12. This engine is a conventional piston engine, and the piston (not shown) is operable in the cylinder 12 and is connected with the engine crankshaft 14 by a conventional connecting rod 15. This crankshaft extends generally vertical and projects through the opening 16 in the wall of the crankcase.

A closure structure is secured to the crankcase and comprises a flanged crankshaft bearing plate 18 and an adapter 19, said adapter being secured to the crankcase by suitable bolts 20 and to the plate 18 by suitable bolts 21. The adapter is provided with a machined boss 22 piloted in the crankcase opening 16 to axially locate and position the plate 18 to align the crankshaft bearings 23 with the crankshaft extension 14a.

The plate 18 is constructed with a hub portion 25 provided with an annular recessed oil pocket 26 arranged concentric with the crank shaft axis. It is also constructed with a saucer like flange 27 providing an oil sump 28. The outer rim 29 of this flange 27 receives the peripheral rim of the adapter 19 and suitable gaskets are employed between the plate and adapter and between the adapter and crankcase (see Fig. 4).

It will be observed that the hub portion 25 of the plate extends or projects through the crankcase opening 16 and through the opening 30 in the adapter 19, and that this opening 30 is greater than the outside diameter of the hub portion 25 so as to permit oil to drain by gravity from the interior of the crankcase 11 into the oil sump 28. A hole 31 connects the sump 28 with the annular recess or trough 26, so as to meter an adequate flow of oil from the sump to the trough.

The crankshaft may be forged of an integral structure or the crankshaft extension 14a may be a separate shaft from the crankshaft proper and rigidly secured thereto in any known manner. The crankshaft 14 carries a crank portion 35 and a pair of counterweights 36 preferably oppositely disposed with respect to the crank portion. The counterweighted portion 36 of the crankshaft most closely adjacent to the bottom of the crankcase is provided with a sloping hole 37 in which is securely fixed a dipper tube 38. This dipper tube is moved round and round through the trough 26 and picks up or scoops up the lubricating oil from said trough and discharges same into the crankcase interior. Preferably this dipper tube directs the oil generally towards the other counterweight 36, the oil stream discharged therefrom being broken up into a mist which circulates around in the crankcase and to the moving engine parts which require such lubrication.

It will be apparent to those versed in the art to which my invention pertains, that, though I have illustrated but one embodiment of the invention, various changes and modifications may be made in structure without departing from the spirit of my invention or from the scope of the appended claims.

I claim:

1. In an internal combustion engine having a vertically extending crankshaft, a crankcase having a bottom opening through which said crankshaft extends, a closure structure for the crankcase opening and provided with an oil sump portion and chamber openly communicating with the crankcase interior through the said opening and with an annular recessed lubricant collecting trough communicating with said oil sump portion and disposed substantially concentric with respect to the crankshaft axis, and a dipper carried by said crankshaft and disposed to travel in said trough and to scoop lubricating oil out of said trough and discharge same into the crankcase interior to lubricate moving engine parts.

2. In an internal combustion engine having a vertically extending crankshaft, a crankcase having a bottom opening through which said crankshaft extends, a closure structure for said crankcase opening and provided with a lubricant sump and chamber openly communicating with the crankcase interior through the said opening and with an annular trough communicating with said oil sump and disposed substantially concentric with respect to the crankshaft axis, said closure structure having an opening connecting said trough with said lubricant sump, and a dipper carried by said crankshaft and disposed to travel in said trough and to scoop lubricating oil out of said trough and discharge same directly into the crankcase interior to lubricate moving engine parts.

3. In an internal combustion engine having a vertically extending crankshaft, a crankcase having a bottom opening through which said crankshaft extends, a closure structure for the crankcase opening comprising a member having a hub portion carrying crankshaft bearing means and having an outwardly flanged saucer-like portion providing a lubricant sump around said hub portion, and an adapter piloted in said crankcase opening and secured to said member and serving to axially align the crankshaft bearing means with said crankshaft, said hub portion provided with an upwardly opening annular trough connected with the lubricant sump, and a dipper carried by said crankshaft and disposed to travel in said trough and to scoop lubricating oil out of said trough and to discharge same directly into the crankcase interior to lubricate moving engine parts.

4. In an internal combustion engine having a vertically extending crankshaft, a crankcase having a bottom opening through which said crankshaft extends, a closure structure for the crankcase opening comprising a member having a hub portion carrying crankshaft bearing means and having an outwardly flanged saucer-like portion providing a lubricant sump around said hub portion, and an adapter piloted in said crankcase opening and secured to said member and serving to axially align the crankshaft bearing means with said crankshaft, said hub portion projecting into said crankcase opening and provided with an upwardly opening annular trough open inwardly of the crankcase interior and connected with the lubricant sump, and a dipper carried by said crankshaft and disposed to travel in said trough and to scoop lubricating oil out of said trough and to discharge same directly into the crankcase interior to lubricate moving engine parts.

5. In an internal combustion engine having a vertically extending crankshaft, a crankcase having a bottom opening through which said crankshaft extends, a closure structure for the crankcase opening comprising a member having a hub portion carrying crankshaft bearing means and having an outwardly flanged saucer-like portion providing a lubricant sump around said hub portion, and an adapter piloted in said crankcase opening and secured to said member and serving to axially align the crankshaft bearing means with said crankshaft, said hub portion projecting into said crankcase opening and provided with an annular trough open inwardly of the crankcase interior and connected with the lubricant sump, and a dipper carried by said crankshaft and disposed to travel in said trough and to scoop lubricating oil out of said trough and to discharge same directly into the crankcase interior to lubricate moving engine parts, said adapter having an opening encircling said hub portion and spaced from the external surface of said hub to provide an opening permitting lubricant to drain from said crankcase interior into said lubricant sump, the outer peripheral rim of said adapter being joined with the outer peripheral rim of said saucer like portion of the closure structure member.

6. In an internal combustion engine having a vertically extending crankshaft, a crankcase having a bottom opening through which said crankshaft extends, a closure structure for the crankcase opening comprising a member having a hub portion carrying crankshaft bearing means and having an outwardly flanged saucer like portion providing a lubricant sump around said hub portion, and an adapter piloted in said crankcase opening and secured to said member and serving to axially align the crankshaft bearing means with said crankshaft, said hub portion projecting into said crankcase opening and provided with an annular trough open inwardly of the crankcase interior and connected with the lubricant sump, said crankshaft having a crank portion and a counterweighted portion, and a dipper carried by said counterweighted portion and disposed to travel in said trough and to scoop lubricating oil out of said trough and to discharge same directly into the crankcase interior to lubricate moving engine parts.

7. In an internal combustion engine having a vertically extending crankshaft, a crankcase having a bottom opening through which said crankshaft extends, said crankshaft having a crank portion and counterweighted portions extending oppositely to the offset crank portion, a closure structure secured to the crankcase to enclose the bottom opening of the crankcase, said closure structure having a saucer-like lubricant sump portion and a hub portion supporting the crankshaft, said hub portion having an annular trough concentric with respect to the crankshaft axis and communicated with said lubricant sump portion, and a dipper tube carried by said counterweighted portion most closely adjacent to said hub portion of said closure member and projected into said annular trough, said dipper tube arranged to travel in said trough and to scoop lubricating oil out of said trough and to discharge same generally toward said other counter weighted portion of the crankshaft and into the crankcase interior to lubricate moving engine parts.

LAURENCE D. BAKKE.

REFERENCES CITED

The following references are of record in the file of this patent:

UNITED STATES PATENTS

| Number | Name | Date |
|---|---|---|
| 2,149,580 | Collins | Mar. 7, 1939 |
| 2,539,619 | Goodall | Jan. 30, 1951 |